US008100243B2

(12) United States Patent
Morino et al.

(10) Patent No.: US 8,100,243 B2
(45) Date of Patent: Jan. 24, 2012

(54) BILL DISCRIMINATING AND COUNTING APPARATUS

(75) Inventors: Hajime Morino, Hyogo (JP); Toshio Numata, Hyogo (JP); Shinji Matsuura, Hyogo (JP); Shinji Matsui, Hyogo (JP)

(73) Assignee: Glory Ltd., Hyogo (JP)

( * ) Notice: Subject to any disclaimer, the term of this patent is extended or adjusted under 35 U.S.C. 154(b) by 1114 days.

(21) Appl. No.: 11/665,152

(22) PCT Filed: Oct. 12, 2004

(86) PCT No.: PCT/JP2004/015344

§ 371 (c)(1), (2), (4) Date: Apr. 12, 2007

(87) PCT Pub. No.: WO2006/040836

PCT Pub. Date: Apr. 20, 2006

(65) Prior Publication Data

US 2009/0028285 A1 Jan. 29, 2009

(51) Int. Cl.
*G07F 7/04* (2006.01)
*G06F 17/28* (2006.01)

(52) U.S. Cl. .......................................................... 194/206

(58) Field of Classification Search .................. 194/206, 194/217; 902/39

See application file for complete search history.

(56) References Cited

U.S. PATENT DOCUMENTS 4,761,542 A 8/1988 Kubo et al.
6,119,611 A 9/2000 Tomita
6,241,069 B1 * 6/2001 Mazur et al. .................. 194/207
6,266,070 B1 7/2001 Shigi et al.
6,467,038 B1 * 10/2002 Piwonka et al. .................. 713/1
7,802,184 B1 * 9/2010 Battilana ....................... 715/257
2003/0118228 A1 6/2003 Mennie et al.

FOREIGN PATENT DOCUMENTS

CN 1217524 A 5/1999
GB 2120437 A 11/1983
JP 62-209690 A 9/1987
JP 2000-176186 A 6/2000
JP 2003-296801 A 10/2003
WO 9948040 A1 9/1999

OTHER PUBLICATIONS

Communication dated Apr. 8, 2011 issued by the State Intellectual Property Office of P.R. China in counterpart Chinese Patent Application No. 200480044219.6.

* cited by examiner

*Primary Examiner* — Mark Beauchaine
(74) *Attorney, Agent, or Firm* — Sughrue Mion, PLLC

(57) ABSTRACT

The present invention relates to a bill discriminating and counting apparatus including a display section which can perform display written in plural languages. The bill discriminating and counting apparatus includes a second storage area in which display data of a mother language can be written in addition to a first storage area in which data for the display written in commonly-used English is stored, and the display written in the mother language can be performed by writing the display data written in the mother language in the second storage area in the country where the bill discriminating and counting apparatus is used.

4 Claims, 5 Drawing Sheets

| ITEM | EXAMPLE |
|---|---|
| ①APPARATUS TYPE<br>MESSAGE | GFR-X<br>ACCEPTED<br>HELLO |
| ②BILL OF COUNTING TARGET | EURO |

FIG.5

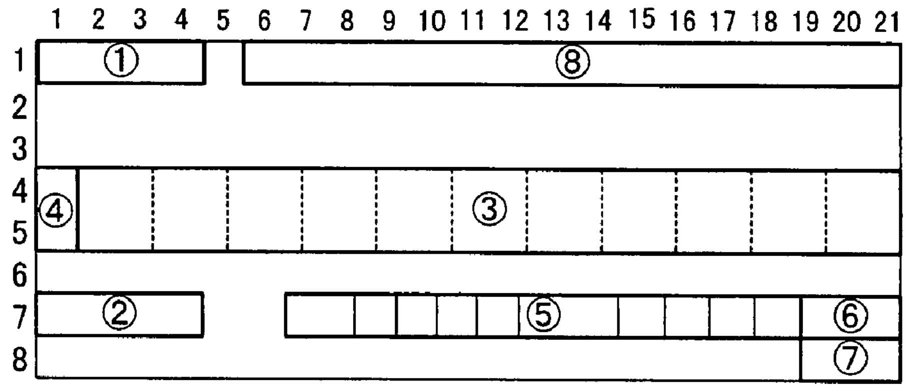

| ITEM | EXAMPLE |
|---|---|
| ① MODE | MIX/D.D |
| ② PRESENCE OR ABSENCE OF REJECTED BILL | RJ |
| ③ TOTAL MOUNT | WITH DOT, WITH COMMA |
| ④ BILL MARK | $、¥ |
| ⑤ THE NUMBER OF COUNTING BILLS | MESSAGE OF "ON LINE" IS DISPLAYED DURING INTERFACE |
| ⑥ DESIGNATION OF UNIT | PCS, HOWEVER, DESIGNATION OF UNIT IS NOT DISPLAYED DURING INTERFACE |
| ⑦ COUNTRY CODE | JP (Japan), US (United States of America) |
| ⑧ MESSAGE 1 | Check Stacker<br>Check Reject<br>Stacker Full<br>Reject Full<br>HOPPER<br>Sensor Cleaning<br>Suspicious<br>PRINTER ERROR<br>BATCH |

BILL DISCRIMINATING AND COUNTING APPARATUS

TECHNICAL FIELD

The present invention relates to a bill discriminating and counting apparatus which discriminates a denomination of a bill received through a hopper while counting a total amount of the received bills or the number of bills in each denomination, particularly to the bill discriminating and counting apparatus including a display unit which can perform display written in plural languages.

BACKGROUND ART

There is a well known bill discriminating and counting apparatus, in which bills having mixed denominations are collectively received from a hopper, the bills are fed and carried one by one, the bills are counted while the denomination and authenticity of the bills are discriminated, and the total amount of the normal bills or the number of bills in each denomination is counted and displayed (for example, see Japanese Patent Application Laid-Open No. 2003-296801).

A structure and an operation of a conventional bill discriminating and counting apparatus will be described with reference to FIG. 1. FIG. 1 is a longitudinal cross-sectional view showing an internal structure of the conventional bill discriminating and counting apparatus.

A feeding roller 5 feeds the bill placed in a hopper 1 to a transport path of the bill discriminating and counting apparatus, and the bill is carried by plural carrying rollers 6.

During the bill carrying, the bill passes through detection sensors 7*a* and 7*b*, and a bill discriminating sensor 8 discriminates the denomination and authenticity. Then, the bill passes through a detection sensor 7*c*, and the bill is received between blades of a rotating impeller 9 when the bill is a normal bill, and the bills are aligned and collected in a stacker 2. On the other hand, when the bill discriminating sensor judges that the bill is a forged bill, a solenoid 10 is operated to move a branching pawl 11 downward, and the bill is delivered to a rejection section 3.

The numeral 4 designates an operation and display section which performs various settings in performing the bill discriminating and counting process and displays the counted total amount and the like.

Japanese Patent Laid-Open No. 62-209690 and U.S. Pat. No. 6,621,919, for example, disclose a bill discriminating and counting apparatus in which the display (such as a kind of currency, a unit of currency, a process content, and display of an error) of the operation and display section 4 can be written in plural languages.

In the bill discriminating and counting apparatus disclosed in Japanese Patent Laid-Open No. 62-209690 and U.S. Pat. No. 6,621,919, the displays written in plural languages are previously stored in a memory area, the desired language is called if needed, and the display written in the desired language is performed on the display section.

DISCLOSURE OF THE INVENTION

However, in the conventional technique, it is necessary that the displays written in plural languages be previously stored in a memory area, and it is also necessary to accordingly increase a memory capacity, which results in an unfavorable cost increase.

In view of the foregoing, an object of the invention is to provide a bill discriminating and counting apparatus which can perform the display written in the desired language characters without increasing the memory capacity.

Means for Solving the Problems

In order to achieve the object of the invention, a bill discriminating and counting apparatus includes a hopper which receives bills to be processed; a feeding and carrying section which feeds the bills received by said hopper one by one to a transport path and carries the bill; a discriminating and counting section which is provided on a downstream side of said feeding and carrying section, said discriminating and counting section discriminating denominations of the carried bills and counting the bills; and a stacker which is provided on the downstream side of said discriminating and counting section, said stacker collecting the bills in which normality is confirmed, wherein the bill discriminating and counting apparatus includes: an operation and display section which displays display data; a storage section in which the display data is stored, said storage section including a read-only storage area as a first storage area and a writable storage area as a second storage area, display data written in English being stored in said first storage area, display data written in any language being stored in said second storage area; and display selection means for arbitrarily selecting the display data written in English stored in said first storage area and the display data stored in said second storage area to display the display data on said operation and display section.

The object of the invention is effectively achieved by consisting said second storage area with a rewritable memory.

According to the invention, only the display written in English is always stored in said first storage area, a memory capacity for one country is reserved in said second storage area, and the data for the display written in the language a user desires is produced by a general-purpose computer and written in said second storage area. Therefore, the excessive memory capacity is not required.

BRIEF DESCRIPTION OF THE DRAWINGS

FIG. 5 shows a display example (during bill counting process) of the operation and display section.

BEST MODE FOR CARRYING OUT THE INVENTION

The invention relates to a bill discriminating and counting apparatus including a display section which can perform display written in plural languages. The bill discriminating and counting apparatus of the invention includes a second storage area in which display data of a mother language can be written in addition to a first storage area in which data for the display written in commonly-used English, and the display written in the mother language can be performed by writing the display data written in the mother language in the second storage area in the country where the bill discriminating and counting apparatus is used.

The bill discriminating and counting apparatus according to the invention will be described in detail with reference to the drawings.

Figure 1:
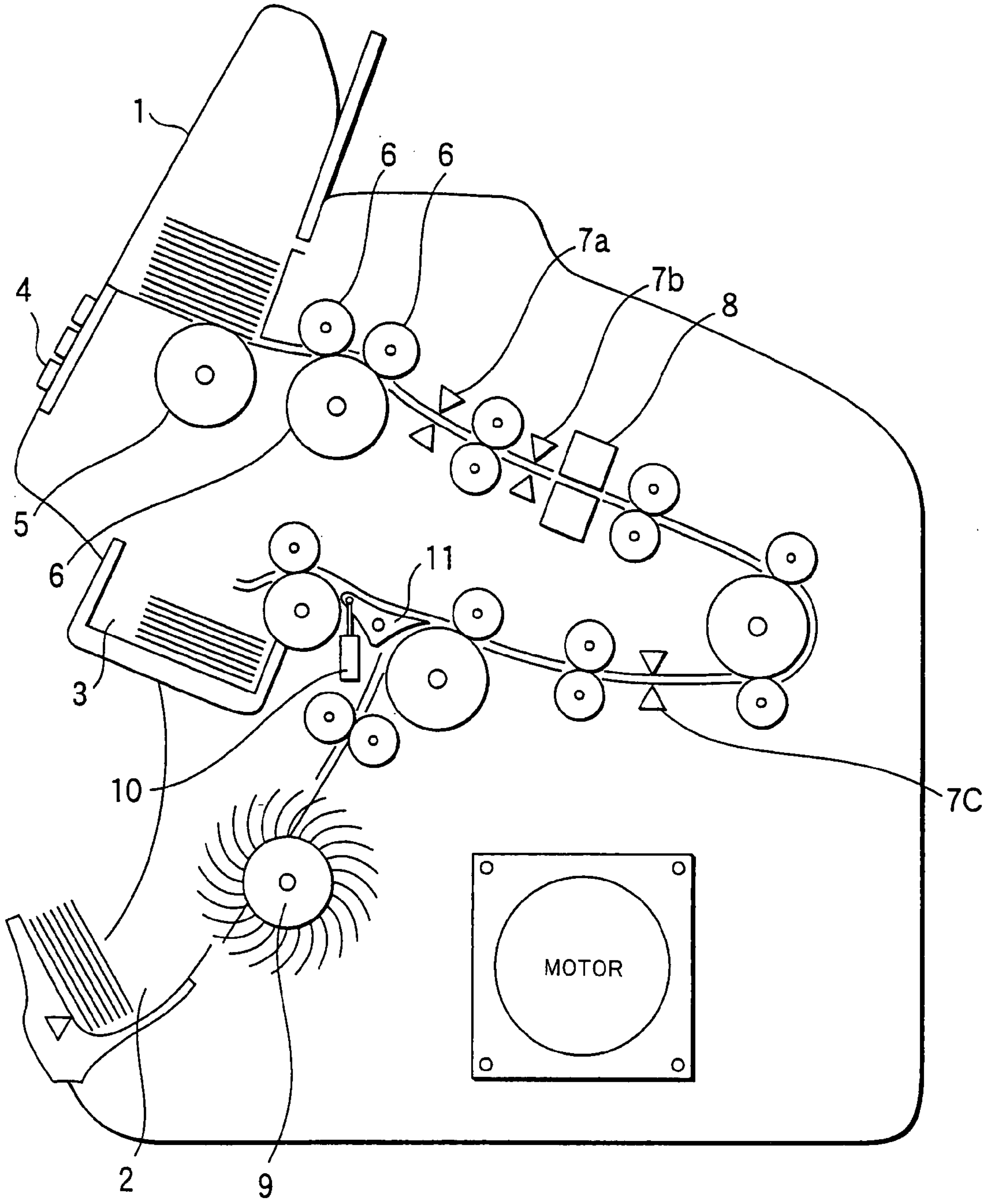
FIG. 1 shows an internal structure of a conventional bill discriminating and counting apparatus.
Figure 2:
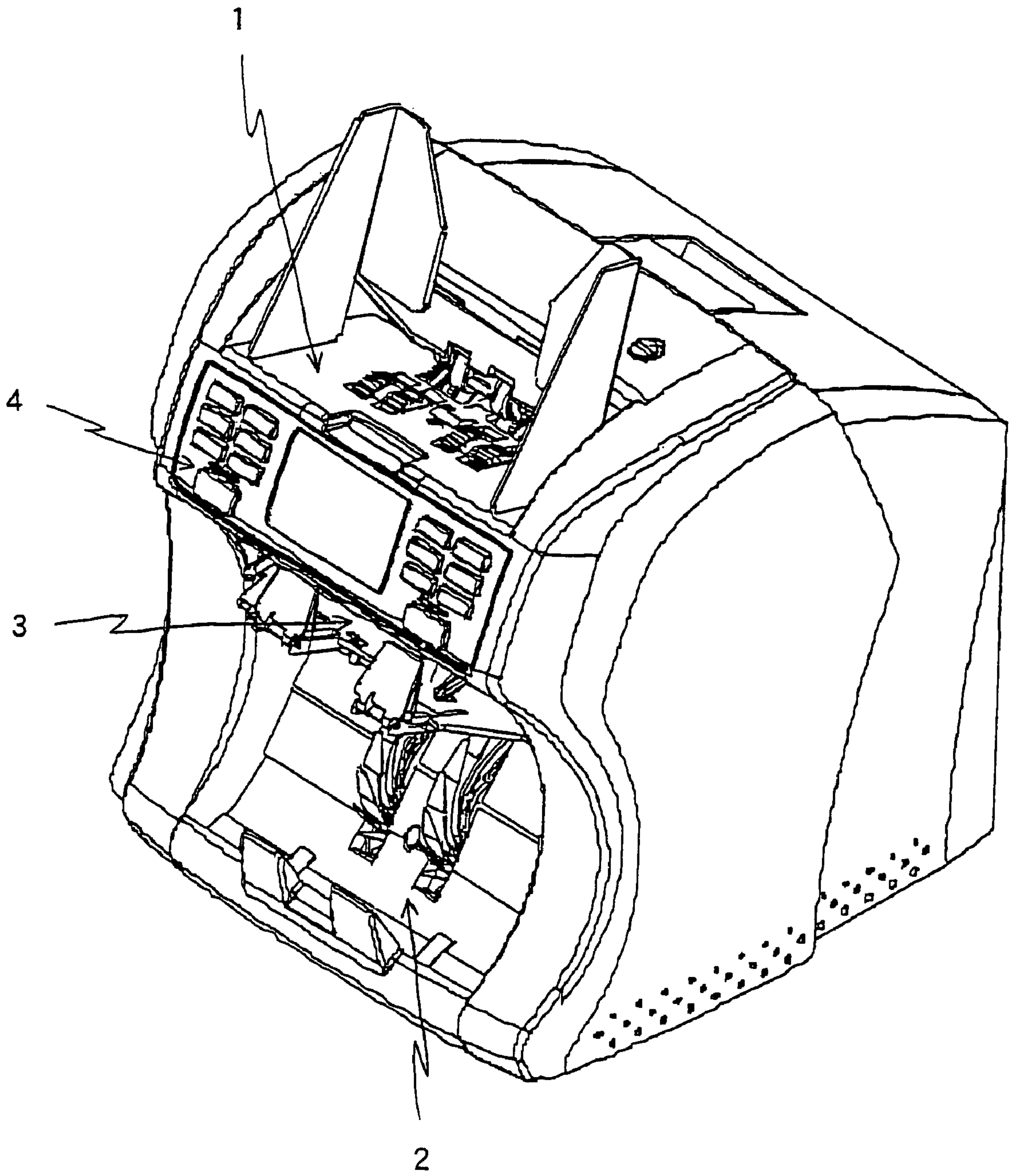
FIG. 2 is a perspective view showing an appearance of a bill discriminating and counting apparatus according to the invention.

FIG. 2 is a perspective view showing an appearance of the bill discriminating and counting apparatus according to the invention. The bills put in from the hopper 1 are discriminated and counted by the bill discriminating and counting apparatus, and the bill are aligned and collected in the stacker 2. The bill in which the process cannot be performed due to the forged bill or dirt is delivered to the rejection section 3. The operation and display section 4 includes various operation buttons, and the operation and display section 4 displays the counted total amount and the like in a predetermined language while performing various settings in performing the bill discriminating and counting process.

Figure 3:
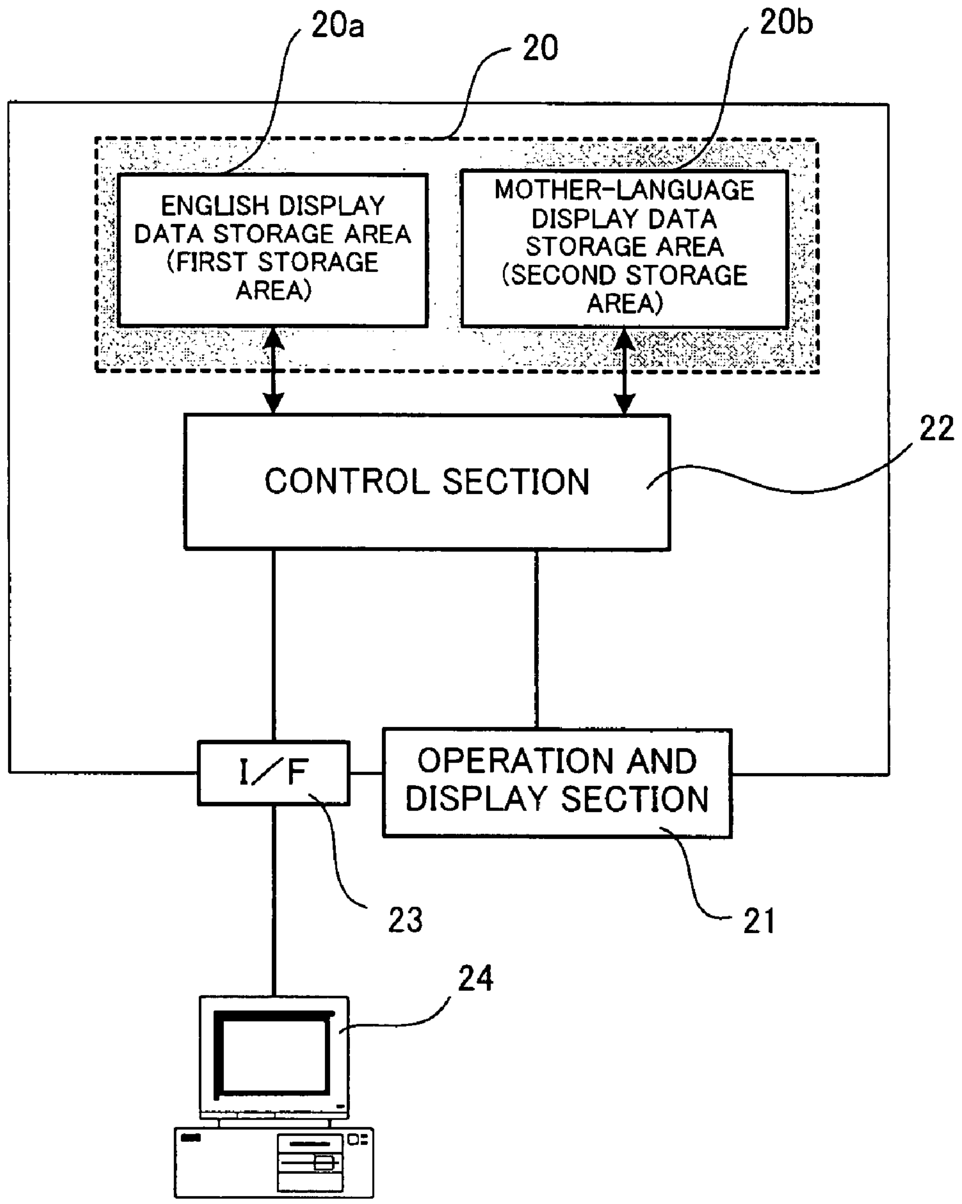
FIG. 3 is a block diagram showing a part concerning display of the bill discriminating and counting apparatus according to the invention.

FIG. 3 is a block diagram showing a part concerning the display of the bill discriminating and counting apparatus according to the invention.

The display data is store in a storage section 20, and contents displayed on an operation and display section 21 are expressed in various languages in the display data. English display data is stored in a first storage area 20*a*. A user can arbitrarily write data in a second storage area 20*b*, and usually the user writes the display data written in the mother language in the second storage area 20*b*. In changing the languages displayed on the operation and display section 21, the user provides an instruction to a control unit 22 through an operation button (not shown) of the operation and display section 21, and thereby the control section 22 reads the display data written in the instructed language from the storage area (20*a* or 20*b*) to perform the display. Accordingly, display selection means includes the operation and display section 21 and the control section 22.

A computer 24 connected to the outside through an interface 23 produces the display data of the mother language based on the English display data read from the first storage area 20*a*, and the display data of the mother language is used when the display data of the mother language is written in the second storage area 20*b*.

Figure 4:
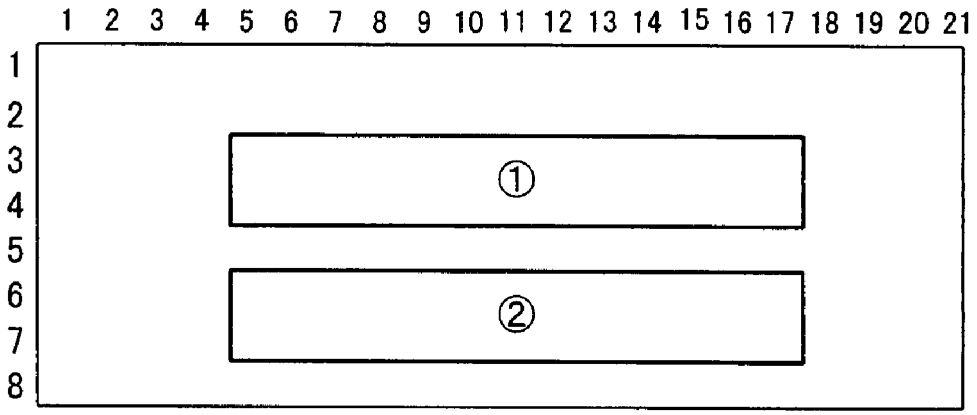
FIG. 4 shows a display example (initial state) of an operation and display section.

FIG. 4 shows a display example (initial state) of the operation and display section. When the bill discriminating and counting apparatus is turned on, the example shown in FIG. 4 is initially displayed. In FIG. 4, a type of apparatus (for example, GFR-X) and a message (for example, HELLO) are displayed in an area 1, and a bill (for example, EURO or YEN), which becomes a counting target, is displayed in an area 2. The pieces of display data are stored in the storage areas 20*a* and 20*b* of the storage section 20 while related to pieces of position information (pieces of position information on the areas 1 and 2) displayed as bitmap data.

Conventionally, a font corresponding to each language is previously stored in the memory, characters to be displayed are previously retained in the memory using a table such as an ASCII code, and the font corresponding to the table is displayed by dots. However, a huge amount of font is required to display the characters written in various languages, and the memory has a limitation to retain the font data. Therefore, words of each language corresponding to English words are previously produced by the bitmap data, and the language words are stored in the memory along with the position information on the display area.

FIG. 5 shows a display example of the operation and display section during the bill counting process. In an area 1 of FIG. 5, a process mode is displayed in each language. In English, MIX (domination mixture) or D.D (only one kind of domination) is displayed. Presence or absence of the rejected bill is displayed in an area 2. Contents displayed in items 3 to 8 are shown in the list in the bottom of FIG. 5 respectively. The pieces of display data written in English corresponding to the items 1 to 8 are previously stored in the first storage area 20*a*. Therefore, the display data written in English is downloaded on the computer 24, and the display data written in English is translated into the mother language, and the bitmapped display data is written in the second storage area 20*b* along with the position information on the display area. The contents in the second storage area are appropriately rewritable, so that the second storage area can be used for rewriting the display data of the mother language into the display data of another language.

The first storage area 20*a* and the second storage area may be set in the same memory, or the first storage area 20*a* and the second storage area may be set in the different memories respectively. The second storage area may be consisting of a removable storage medium (for example, memory card). Therefore, usability of the bill discriminating and counting apparatus is further improved.

The invention claimed is:

1. A bill discriminating and counting apparatus comprising:

a hopper which receives bills to be processed;

a feeding and carrying section which feeds the bills received by said hopper one by one to a transport path and carries the bills;

a discriminating and counting section which is provided on a downstream side of said feeding and carrying section, said discriminating and counting section discriminates denominations of the carried bills and counts the bills;

a stacker which is provided on the downstream side of said discriminating and counting section, said stacker collects the bills in which normality is confirmed;

an operation and display section which displays display data;

a storage section in which the display data is stored, said storage section includes a first storage area in which the stored display data is an English word and a second storage area in which the stored display data is a bitmap data, wherein the bitmap data shows a non-English word translated from the English word in the first storage by an outside computer; and display selection means for arbitrarily selecting the display data written in English stored in said first storage area and the display data stored in said second storage area to display the display data on said operation and display section.

2. The bill discriminating and counting apparatus according to claim 1, wherein said first storage area and said second storage area are set in different memories respectively.

3. The bill discriminating and counting apparatus according to claim 1, wherein said second storage area is rewritable.

4. The bill discriminating and counting apparatus according to claim 3, wherein said first storage area and said second storage area are set in different memories respectively.

* * * * *